(12) United States Patent
Iwasaki

(10) Patent No.: US 9,759,475 B2
(45) Date of Patent: Sep. 12, 2017

(54) OUTDOOR UNIT AND AIR-CONDITIONING APPARATUS

(75) Inventor: Kazuhisa Iwasaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 515 days.

(21) Appl. No.: 14/359,586

(22) PCT Filed: Jun. 8, 2012

(86) PCT No.: PCT/JP2012/003752
§ 371 (c)(1),
(2), (4) Date: May 21, 2014

(87) PCT Pub. No.: WO2013/088590
PCT Pub. Date: Jun. 20, 2013

(65) Prior Publication Data
US 2014/0311172 A1    Oct. 23, 2014

(30) Foreign Application Priority Data
Dec. 12, 2011 (JP) .................. 2011-271186

(51) Int. Cl.
F25D 21/06    (2006.01)
F24F 1/06     (2011.01)
(Continued)

(52) U.S. Cl.
CPC .............. F25D 21/06 (2013.01); F24F 1/06 (2013.01); F25B 45/00 (2013.01); F25B 47/02 (2013.01);
(Continued)

(58) Field of Classification Search
CPC .......... F25D 21/06; F25B 47/02; F25B 39/04; F25B 1/00; F25B 49/02; F25B 2400/19;
(Continued)

(56) References Cited

U.S. PATENT DOCUMENTS

| | | | | |
|---|---|---|---|---|
| 5,709,090 A | * | 1/1998 | Endo | F25B 9/006 62/174 |
| 5,987,907 A | * | 11/1999 | Morimoto | F25B 9/006 62/212 |
| 2006/0080989 A1 | * | 4/2006 | Aoki | F25B 40/00 62/324.4 |

FOREIGN PATENT DOCUMENTS

| | | |
|---|---|---|
| JP | 63-290371 A | 11/1988 |
| JP | 05-045022 A | 2/1993 |

(Continued)

OTHER PUBLICATIONS

Office Action mailed Mar. 31, 2015 in the corresponding JP application No. 2013-549057 (English translation attached).
(Continued)

*Primary Examiner* — Emmanuel Duke
(74) *Attorney, Agent, or Firm* — Posz Law Group, PLC

(57) ABSTRACT

An outdoor unit includes a compressor compressing a sucked refrigerant and discharging compress, an outdoor heat exchanger exchanging heat between outdoor air and the refrigerant, an accumulator storing a liquefied refrigerant at a suction side of the compressor, a solenoid valve for storing the refrigerant in the outdoor heat exchanger, and a controller performing control so as to feed the refrigerant stored within the outdoor heat exchanger during a defrosting operation, to the accumulator on the basis of an amount of refrigerant within the accumulator when operation is switched to a heating operation from the defrosting operation.

17 Claims, 8 Drawing Sheets

(51) Int. Cl.
*F25B 47/02* (2006.01)
*F25B 45/00* (2006.01)
*F25C 5/18* (2006.01)
*F24F 11/00* (2006.01)
*F25B 13/00* (2006.01)
*F24D 5/12* (2006.01)

(52) U.S. Cl.
CPC ............... *F25C 5/187* (2013.01); *F24D 5/12* (2013.01); *F24F 2011/0089* (2013.01); *F25B 13/00* (2013.01); *F25B 2313/0294* (2013.01); *F25B 2313/02731* (2013.01); *F25B 2313/02741* (2013.01); *F25B 2345/003* (2013.01); *F25B 2400/19* (2013.01); *F25B 2500/28* (2013.01); *F25B 2600/05* (2013.01); *F25B 2700/03* (2013.01); *F25B 2700/04* (2013.01); *F25C 2700/02* (2013.01); *F25C 2700/04* (2013.01); *F25D 2323/0011* (2013.01)

(58) Field of Classification Search
CPC ......... F25B 2500/28; F24F 1/06; F24F 11/02; F24F 2011/0089
See application file for complete search history.

(56) References Cited

FOREIGN PATENT DOCUMENTS

| | | |
|---|---|---|
| JP | 08-075274 A | 3/1996 |
| JP | 2001-133056 A | 5/2001 |
| JP | 2001-141324 A | 5/2001 |
| JP | 2003-343896 A | 12/2003 |
| JP | 2008-082653 A | 4/2008 |
| JP | 2009-036502 A | 2/2009 |
| WO | 2006/115053 A1 | 11/2006 |

OTHER PUBLICATIONS

Extended European Search Report issued Jan. 7, 2016 in the corresponding EP application No. 12857708.7.
Office Action issued Jan. 28, 2016 in the corresponding CN application No. 201280061306.7 (with English translation).
International Search Report of the International Searching Authority mailed Aug. 21, 2012 for the corresponding international application No. PCT/JP2012/003752 (and English translation).
Office Action issued on Aug. 15, 2016 in the corresponding CN application No. 201280061306.7 (English translation attached).
Chinese Office Action of Jan. 16, 2017 in the corresponding CN application No. 201280061306.7(English translation attached).

* cited by examiner

OUTDOOR UNIT AND AIR-CONDITIONING APPARATUS

CROSS REFERENCE TO RELATED APPLICATIONS

This application is a U.S. national stage application of PCT/JP2012/003752 filed on Jun. 8, 2012, and is based on Japanese Patent Application No. 2011-271186 filed on Dec. 12, 2011, the contents of which are incorporated herein by reference.

TECHNICAL FIELD

The present invention relates to an outdoor unit or the like. The present invention particularly relates to an excess refrigerant process by a defrosting operation.

BACKGROUND

As an existing air-conditioning apparatus, there is an air-conditioning apparatus in which, for example, a compressor, a four-way valve, an outdoor heat exchanger, an electric expansion valve, and an indoor heat exchanger are connected in this order, and which is configured to be able to operate reversibly in a cooling cycle or a heating cycle by switching the four-way valve (e.g., see Patent Literature 1). When frost occurs on the outdoor heat exchanger during a heating operation, switching is performed from the heating cycle to the cooling cycle, a high-temperature and high-pressure gas refrigerant is supplied from the compressor to the outdoor heat exchanger and a reverse defrost operation is performed.

PATENT LITERATURE

Patent Literature 1: Japanese Unexamined Patent Application Publication No. S63-290371 (FIG. 1)

In the air-conditioning apparatus described in the above Patent Literature 1, for example, when ending a defrosting operation and returning to a heating operation, a refrigerant circulating amount is not controlled. Thus, for example, when a heating operation is performed in a state where a liquid level in an accumulator is high, there is a possibility that a lot of a liquid refrigerant flows into the accumulator, leading to overflow. Then, when such a situation is repeated, the reliability of the air-conditioning apparatus (in particular, the compressor) is deteriorated, for example, the compressor is broken due to a liquefied refrigerant (liquid refrigerant) being sucked into the compressor.

Thus, in general, an amount of refrigerant is controlled with a liquid level detector provided in the accumulator. In consideration of the cost, productivity, and reliability of the liquid level detector, it is more realistic to sufficiently increase the capacity of the accumulator to prevent overflow of the refrigerant. However, when the capacity of the accumulator is increased in preparation for overflow, it is impossible to meet demands for compactification and cost reduction. In particular, in the case where an air-conditioning apparatus is configured by combining a plurality of outdoor units, in order to prepare for overflow in each outdoor unit, the capacity of an accumulator provided in each outdoor unit has to be sufficiently increased, and the apparatus is further increased in size.

SUMMARY

The present invention has been made in order to overcome the above-described problem, and an object of the present invention is to obtain an outdoor unit or the like which are able to adjust a liquid refrigerant within an accumulator in accordance with, for example, the capacity of the accumulator or the like.

The outdoor unit according to the present invention is an outdoor unit connected to an indoor unit via a pipe to form a refrigerant circuit, the outdoor unit including: a compressor which compresses a sucked refrigerant and discharges the refrigerant; an outdoor heat exchanger which exchanges heat between outdoor air and the refrigerant; an accumulator which stores a liquefied refrigerant at a suction side of the compressor; storage adjusting means for storing the refrigerant in the outdoor heat exchanger; and a controller which performs control so as to cause the refrigerant stored within the outdoor heat exchanger during a defrosting operation to flow into the accumulator on the basis of an amount of refrigerant within the accumulator when operation is switched to a heating operation from a defrosting operation.

According to the outdoor unit according to the present invention, for example, when shifting from a defrosting operation to a heating operation, the refrigerant stored in the outdoor heat exchanger by the storage adjusting means during the defrosting operation is caused to flow in in accordance with a liquid level state (amount of refrigerant) of the accumulator, and thus a large amount of the liquid refrigerant does not flow into the accumulator. Therefore, it is possible to correct an excessive liquid back amount to the compressor, and it is possible to prevent damage or the like of the compressor and to ensure reliability of the air-conditioning apparatus.

DETAILED DESCRIPTION

Hereinafter, embodiments of the present invention will be described with reference to the drawings.

Embodiment 1

Figure 1:
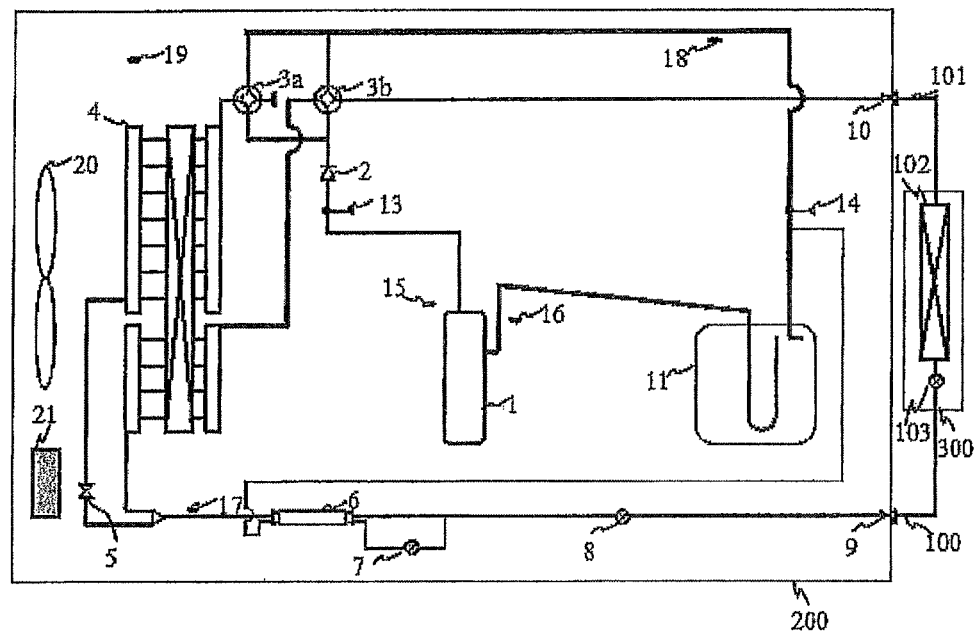
FIG. 1 is a diagram showing a configuration of an air-conditioning apparatus according to Embodiment 1 of the present invention.

FIG. 1 is a diagram showing a configuration of an air-conditioning apparatus according to Embodiment 1 of the present invention. The configuration, an operation, and the like of the air-conditioning apparatus will be described with reference to FIG. 1. The air-conditioning apparatus forms a refrigerant circuit through which a refrigerant circulates, and performs a cooling operation, a heating operation, and a defrosting operation by using a refrigeration cycle (heat pump cycle). In the embodiment, the heating operation and the defrosting operation will be described on the basis of the contents of the present invention. Here, regarding levels of temperature, pressure, and the like, a level or the like is particularly not determined by a relationship with an absolute value, and is determined relatively in a state, an operation, or the like of the apparatus or the like. In addition, the configuration of the air-conditioning apparatus in FIG. 1 and the like is an example, and the present invention is not limited to this configuration.

As shown in FIG. 1, in the air-conditioning apparatus, an outdoor unit 200 and an indoor unit 300 are connected to each other via a liquid-side refrigerant pipe 100 and a gas-side refrigerant pipe 101, thereby forming a refrigerant circuit. The air-conditioning apparatus is able to perform the cooling operation, the heating operation, and the defrosting operation by circulating the refrigerant through the refrigerant circuit.

The outdoor unit 200 includes a compressor 1, a check valve 2, four-way valves 3a and 3b, an outdoor heat exchanger 4, an outdoor heat exchanger capacity control solenoid valve 5 (hereinafter, referred to as solenoid valve 5) 5 which serves as storage adjusting means, a subcooling heat exchanger 6, a subcooling heat exchanger bypass flow control valve (hereinafter, referred to as bypass flow control valve) 7, an outdoor flow control valve 8, a liquid-side opening/closing valve 9, a gas-side opening/closing valve 10, an accumulator 11, a subcooling heat exchanger low-pressure side bypass pipe 12, a controller 21, and an outdoor heat exchanger capacity control regulating valve (hereinafter, referred to as flow control valve) 22. Of them, the compressor 1, the check valve 2, the four-way valves 3a and 3b, the outdoor heat exchanger 4, the solenoid valve 5, the outdoor flow control valve 8, the liquid-side opening/closing valve 9, the gas-side opening/closing valve 10, and the accumulator 11 are devices and the like forming a main refrigerant circuit.

The compressor 1 includes, for example, an inverter drive device, and is able to finely change the capacity of the compressor 1 (an amount of the refrigerant discharged per unit time) by arbitrarily changing a driving frequency. The check valve 2 prevents backward flow of the refrigerant. The four-way valve 3 (the four-way valves 3a and 3b) switches flow of the refrigerant by an operation thereof and on the basis of an instruction from the controller 21. The four-way valves 3a and 3b are connected in parallel in the refrigerant circuit. Here, the four-way valve 3b also serves as storage adjusting means.

The outdoor heat exchanger 4 exchanges heat between the refrigerant and air (outdoor air). For example, during the heating operation, the outdoor heat exchanger 4 serves as an evaporator and exchanges heat between air and a low-pressure refrigerant having flowed thereinto from the outdoor flow control valve 8 side, to evaporate and gasify the refrigerant. In addition, during the cooling operation, the outdoor heat exchanger 4 serves as a condenser. Here, the outdoor heat exchanger 4 according to the embodiment stores the refrigerant (liquid refrigerant) during the defrosting operation (termination stage). In addition, the outdoor heat exchanger 4 has two chains of inflow/outflow paths in the refrigerant circuit for controlling a timing of sending the refrigerant stored during the heating operation to the accumulator 11, etc. Although not particularly limited, a plurality of outdoor heat exchangers 4 may be connected in parallel to provide two chains of inflow/outflow paths.

The solenoid valve 5 which is an opening/closing valve controls flow of the refrigerant in one of the chains of the inflow/outflow paths of the outdoor heat exchanger 4 together with the four-way valve 3b for performing the above refrigerant storing in the outdoor heat exchanger 4 and control of timing of feeding the stored refrigerant to the accumulator 11. In addition, an outdoor fan 20 is provided for efficiently exchanging heat between the refrigerant and air in the outdoor heat exchanger 4. An outdoor fan 105 also includes an inverter drive circuit and is able to arbitrarily change the driving frequency of a fan motor to finely change a rotation speed of the fan.

The outdoor flow control valve 8 is provided between the outdoor heat exchanger 4 and the liquid-side opening/closing valve 9 and is able to adjust an amount of the refrigerant flowing thereinto from the liquid-side refrigerant pipe 100, for example, during the heating operation. The liquid-side opening/closing valve 9 and the gas-side opening/closing valve 10 control flow of the refrigerant between the liquid-side opening/closing valve 9 and the gas-side opening/closing valve 10 and the outside by opening/closing. The accumulator 11 is a means for storing, for example, an excess liquid refrigerant.

The subcooling heat exchanger 6 exchanges heat between the refrigerant flowing through a main flow path of the refrigerant circuit and a refrigerant branched from the flow path and adjusted in flow rate by the bypass flow control valve 7. In particular, when it is necessary to subcool/supercool the refrigerant during the cooling operation, the subcooling heat exchanger 6 subcools/supercools the refrigerant and supplies the refrigerant to the indoor unit 300. A fluid flowing via the bypass flow control valve 7 is returned to the accumulator 11 via a bypass pipe.

The indoor unit 300 includes an indoor heat exchanger 102 and an indoor flow control valve 103. The indoor heat exchanger 102 exchanges heat between the refrigerant and air. For example, during the heating operation, the indoor heat exchanger 102 serves as a condenser, exchanges heat between air and the refrigerant flowing thereinto from the gas-side refrigerant pipe 101, condenses and liquefies the refrigerant (or turns the refrigerant into a two-phase gas-liquid state), and flows the refrigerant to the liquid-side refrigerant pipe 100 side. Meanwhile, during the cooling operation, the indoor heat exchanger 102 serves as an evaporator. The indoor flow control valve 103 is provided for adjusting the pressure of the refrigerant within the indoor heat exchanger 102, etc. by changing its opening degree.

In addition, the controller 21 of the outdoor unit 200 includes, for example, a microcomputer, etc., and controls driving of each actuator provided in the outdoor unit 200

(e.g., the compressor 1, the four-way valves 3a and 3b, the outdoor flow control valve 8, the outdoor fan 200, etc.). In order to obtain data, such as the pressure, the temperature, and the like of the refrigerant within the refrigerant circuit, which is needed for the controller 21 to perform control, detection means such as a first pressure sensor 13, a second pressure sensor 14, a first temperature sensor 15, a second temperature sensor 16, a third temperature sensor 17, a fourth temperature sensor 18, and a fifth temperature sensor 19 are provided.

The first pressure sensor 13 is provided between the compressor 1 and the four-way valves 3a and 3b and detects the pressure (high pressure) of the refrigerant discharged from the compressor 1. The second pressure sensor 14 is provided at the upstream side of the accumulator 11 and detects the pressure (low pressure) of the refrigerant sucked into the compressor 1. The first temperature sensor 15 is provided between the compressor 1 and the four-way valves 3a and 3b and detects the temperature of the refrigerant discharged from the compressor 1. The second temperature sensor 16 is provided between the accumulator 11 and the compressor 1 and detects the temperature of the refrigerant sucked into the compressor 1. The third temperature sensor 17 is provided between the outdoor heat exchanger 4 and the subcooling heat exchanger 6 and detects the temperature of the refrigerant passing between the outdoor heat exchanger 4 and the subcooling heat exchanger 6. The fourth temperature sensor 18 is provided between the outdoor heat exchanger 4 and the accumulator 11 and detects the temperature of the refrigerant passing between the outdoor heat exchanger 4 and the accumulator 11. The fifth temperature sensor 19 detects the ambient temperature of the outdoor unit 200.

Figure 2:
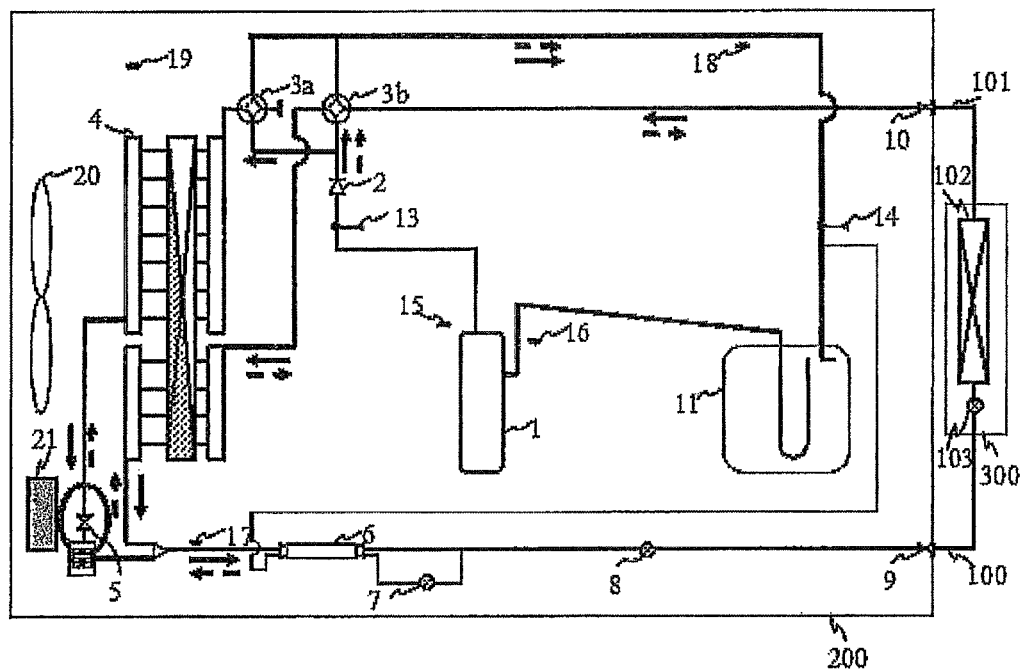
FIG. 2 is a diagram showing flow directions of a refrigerant during a heating operation and a defrosting operation in Embodiment 1 of the present invention.

FIG. 2 is a diagram showing flow directions of the refrigerant during the heating operation and the defrosting operation according to Embodiment 1 of the present invention. Next, an operation and the like of each device during the defrosting operation of the air-conditioning apparatus will be described on the basis of flow of the refrigerant. A solid arrow shown in FIG. 2 indicates flow of the refrigerant during the defrosting operation.

The high-temperature and high-pressure gas refrigerant discharged from the compressor 1 passes through the four-way valves 3a and 3b and flows into the outdoor heat exchanger 4. Although driving of the outdoor fan 20 is stopped, after the refrigerant is condensed and liquefied by the temperature difference between the outdoor temperature, the temperature of frost attached to the outdoor unit 200, and the refrigerant temperature, the refrigerant passes through the liquid-side refrigerant pipe 100 and flows into the indoor unit 300. Since the indoor flow control valve 103 is fully opened, the liquid refrigerant or the refrigerant having low quality flows into the outdoor unit 200 via the gas-side refrigerant pipe 101, passes through the four-way valve 3a, flows into the accumulator 11, and is sucked into the compressor 1 again. At that time, since the liquid refrigerant or the refrigerant having low quality flows into the accumulator 11, the amount of the refrigerant within the accumulator 11 is increased during the defrosting operation, and the liquid level rises. Here, the defrosting operation is performed by using the indoor unit 300, but the operation is possible in a path passing through the subcooling heat exchanger 6 and the bypass flow control valve 7.

Next, an operation and the like of each device during the heating operation of the air-conditioning apparatus will be described on the basis of flow of the refrigerant. A dashed arrow shown in FIG. 2 indicates flow of the refrigerant during the heating operation. The high-temperature and high-pressure gas refrigerant discharged from the compressor 1 passes through the four-way valve 3a and flows into the gas-side refrigerant pipe 101. The gas-state refrigerant having passed through the gas-side refrigerant pipe 101 and supplied to the indoor unit 300 is condensed and liquefied by the indoor unit 300, then is reduced in pressure by the indoor flow control valve 103, and is made into a two-phase refrigerant that has an intermediate pressure and is close to a liquid saturation state. The refrigerant of the intermediate pressure passes through the liquid-side refrigerant pipe 100 and then flows into the outdoor unit 200. The refrigerant of the intermediate pressure having flowed into the outdoor unit 200 is appropriately adjusted by the outdoor flow control valve 8 in its refrigerant flow rate to the outdoor unit 200, and thus is made into a low-pressure two-phase state. The refrigerant turned into the low-pressure two-phase state is evaporated and gasified by the outdoor heat exchanger 4, then passes through the accumulator 11, and is sucked into the compressor 1 again. The accumulator 11 acts similarly as during the defrosting operation.

Figure 3:
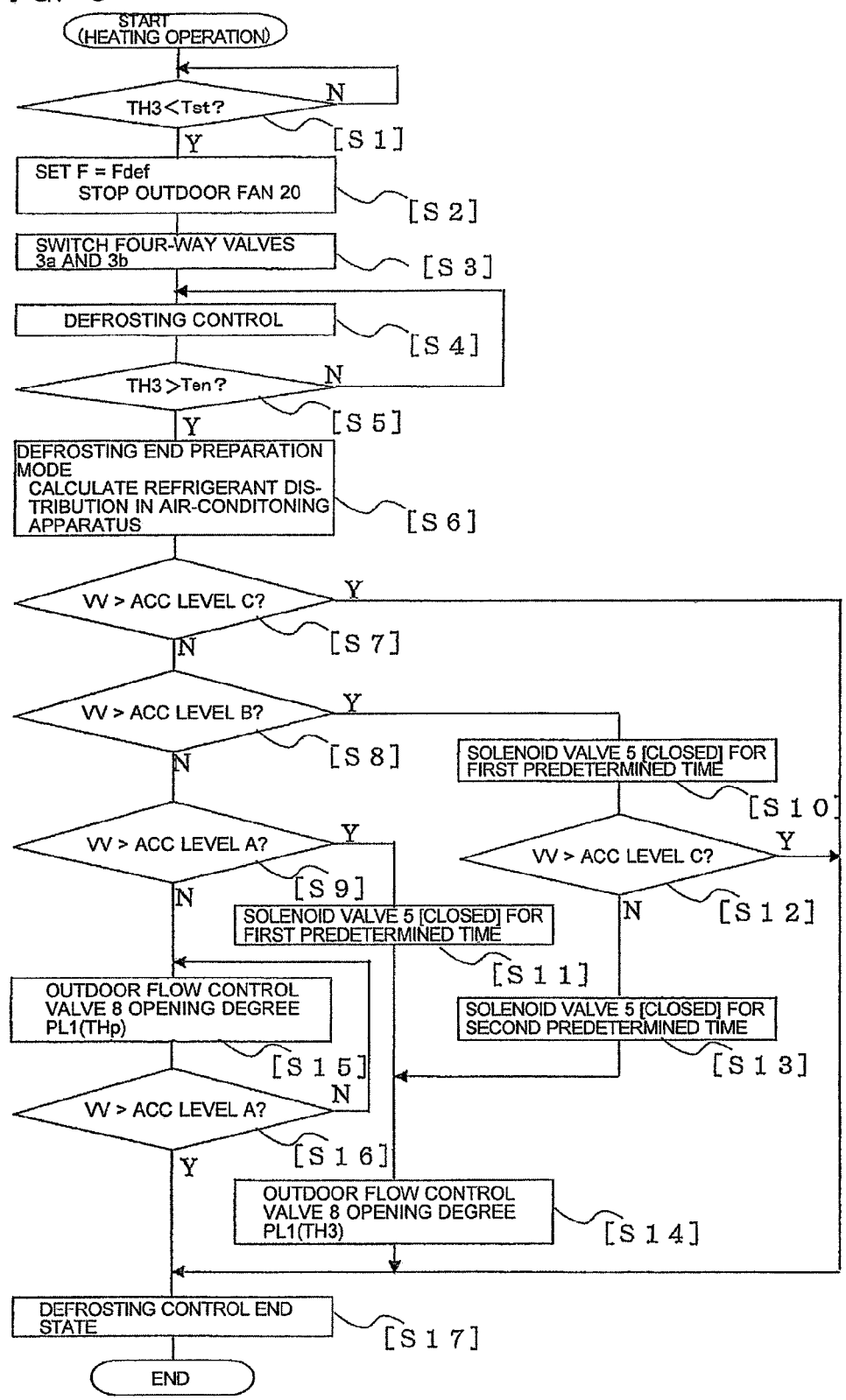
FIG. 3 is a diagram showing flow of a refrigerant control process during the defrosting operation in Embodiment 1 of the present invention.

FIG. 3 is a diagram showing flow of a refrigerant control process related to the defrosting operation in Embodiment 1 of the present invention. The process in FIG. 3 is, in particular, mainly a process for decreasing the amount of the refrigerant within the accumulator 11 in performing the heating operation, at the time of end of the defrosting operation. The refrigerant is stored in a portion within the refrigerant circuit other than the accumulator 11 to decrease the amount of the refrigerant within the accumulator 11, and the refrigerant is caused to flow into the accumulator 11 under control during the heating operation. By so doing, it is possible to quickly stabilize the heating operation. The flow of the control process will be described in detail with reference to FIG. 3.

First, it is determined during the heating operation whether to perform the defrosting operation of the outdoor heat exchanger 4, on the basis of the temperature related to the detection of the third temperature sensor 17. For example, it is determined whether a temperature TH3 according to the detection of the third temperature sensor 17 is lower than a frost determination temperature Tst ([S1]). When it is determined that the temperature TH3 according to the detection of the third temperature sensor 17 is lower than the frost determination temperature Tst, the operation shifts from the heating operation to the defrosting operation. At that time, the driving frequency F of the compressor 1 is set at a defrosting start frequency Fdef and the compressor 1 is driven. In addition, the outdoor fan 20 is stopped ([S2]). Furthermore, the four-way valves 3a and 3b are switched to flow paths for performing the defrosting operation ([S3]). Then, control of the defrosting operation (defrosting control) is performed ([S4]).

After, for example, a given time period elapses from start of the defrosting operation, it is determined whether the temperature TH3 according to the detection of the third temperature sensor 17 is higher than a predetermined temperature Ten ([S5]). Then, when it is determined that TH3 is higher than Ten, the mode shifts to a defrosting end preparation mode. At that time, an amount of the refrigerant distributed within the air-conditioning apparatus (a refrigerant distribution amount) is calculated ([S6]). For example, it is possible to roughly divide locations where the refrigerant is mainly distributed during the defrosting operation, into the inside of the accumulator 11, the inside of the outdoor heat exchanger 4, and the liquid-side refrigerant pipe 100 connecting the outdoor unit 200 to the indoor unit 300.

First, in order to calculate the amount of the refrigerant (liquid refrigerant) within the accumulator 11, a degree of suction superheat TsSH of the compressor 1 or a degree of discharge superheat TdSH of the compressor 1 is calculated. Here, degree of suction superheat TsSH=(detection temperature of the second temperature sensor 16)−(saturation temperature obtained by conversion from the pressure measured by the second pressure sensor 14). In addition, degree of discharge superheat TdSH=(detection temperature of the first temperature sensor 15)−(saturation temperature obtained by conversion from the pressure related to the detection the first pressure sensor 13). Then, an amount Va of refrigerant within the accumulator 11 is estimated on the basis of the degree of suction superheat TsSH or the degree of discharge superheat TdSH of the compressor 1. In addition, in order to detect the amount of the refrigerant within the outdoor heat exchanger 4, the density $\rho(TH3)$ of the liquid refrigerant within the outdoor heat exchanger 4 is calculated from the temperature TH3 according to the detection of the third temperature sensor 17. Then, the amount Vh of refrigerant within the outdoor heat exchanger is estimated as Vh=$\rho(TH3) \times$Vhex by using a preset internal volume Vhex of the outdoor heat exchanger 4. Similarly, regarding an amount of the refrigerant distributed within the liquid-side refrigerant pipe 100 connecting the outdoor unit 200 to the indoor unit 300, the density $\rho(TH3)$ of the liquid refrigerant within the liquid-side refrigerant pipe 100 is calculated from the temperature TH3 according to the detection of the third temperature sensor 17. Then, the amount Vp of refrigerant within the liquid-side refrigerant pipe 100 is estimated as Vp=$\rho(TH3) \times$Vlp by using a preset internal volume Vlp of the liquid-side refrigerant pipe 100.

As described above, a margin with respect to an allowable amount within the accumulator 11 is calculated on the basis of the calculated refrigerant distribution amount distributed at each location, an appropriate process is selected and determined in accordance with a level VV of the volume margin, and control is performed. Here, the volume margin VV is calculated as VV=Vmax−Va−Vh−Vp from the allowable amount Vmax of the accumulator 11 and the amount of liquid-state refrigerant distributed at each location (the liquid volume Va within the accumulator 11, Vh within the outdoor heat exchanger 4, and the liquid volume Vp within the liquid-side refrigerant pipe 100).

Figure 4:
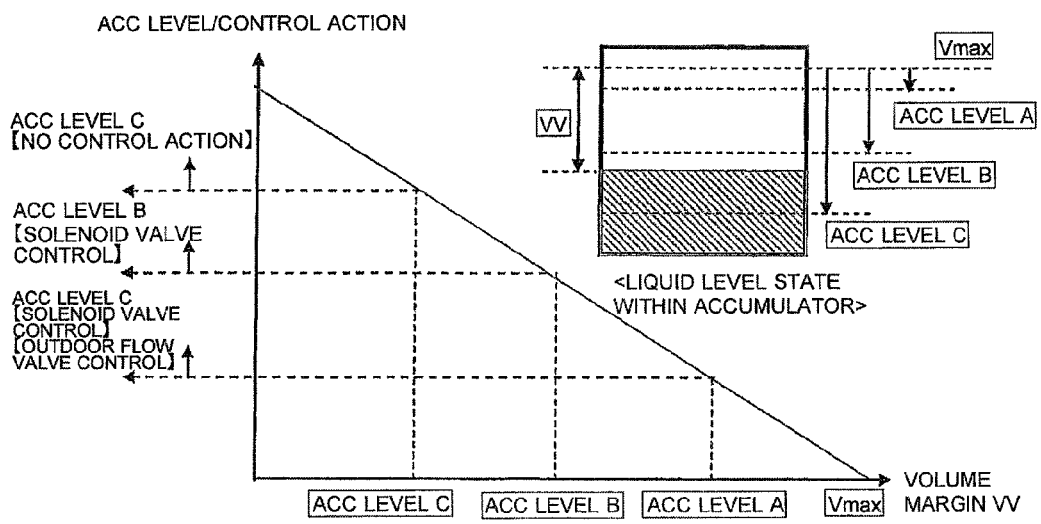
FIG. 4 is a diagram showing a relationship between a liquid level within an accumulator 11, a set level, and a process content.

FIG. 4 is a diagram showing a relationship between a liquid level within the accumulator 11, a set level, and a process content. In the embodiment, for example, level determination values, such as ACC level A, ACC level B, and ACC level C, are set so as to be stepwise in accordance with the liquid level of the liquid refrigerant present within the accumulator 11. Here, a state where the liquid level within the accumulator 11 is high and there is a least margin with respect to the volume margin VV is set as ACC level A. When becoming ACC level B and then ACC level C, it is in a state where more margin can be ensured with respect to the volume margin VV. Then, a process is performed in accordance with a determined level for control.

Therefore, the volume margin VV is compared with ACC level C, ACC level B, and ACC level A in a stepwise manner. First, the volume margin VV is compared with ACC level C ([S7]). When it is determined that the volume margin VV is greater than ACC level C, it is determined that there is a sufficient margin with respect to the allowable amount within the accumulator 11, and the state shifts to a defrosting control end state ([S17]).

Figure 5:
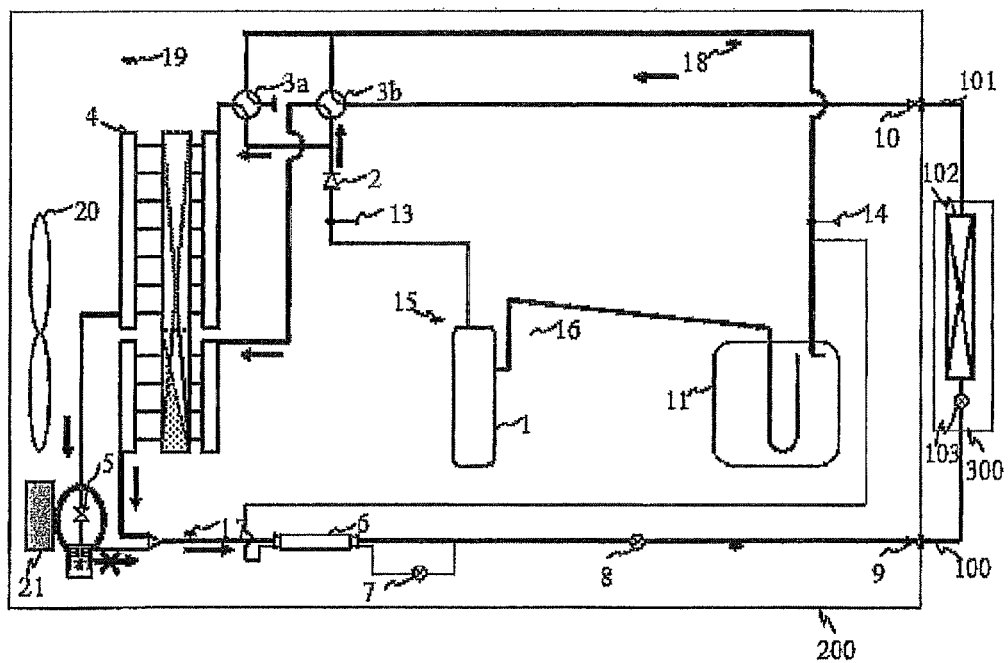
FIG. 5 is a diagram showing flow of the refrigerant when a solenoid valve 5 is closed.

FIG. 5 is a diagram showing flow of the refrigerant when the solenoid valve 5 is closed. On the other hand, when it is determined that the volume margin VV is less than the ACC level, the volume margin VV is compared with ACC level B ([S8]). When it is determined that the volume margin VV is greater than ACC level B, it is determined that the margin is slightly less than ACC level C, and the solenoid valve 5 is closed for a first predetermined time T1 ([S10]). By closing the solenoid valve 5 for the first predetermined time T1, for example, the refrigerant within the accumulator 11 flows into the outdoor heat exchanger 4, and it is possible to store the liquid refrigerant in a part within the outdoor heat exchanger 4. Here, the first predetermined time T1 may be set in accordance with the internal volume of the outdoor heat exchanger 4. In addition, the set time may be changed on the basis of the relationship between the internal volume of the outdoor heat exchanger 4 and the amount Vh of refrigerant within the outdoor heat exchanger. The amount of the liquid refrigerant stored within the outdoor heat exchanger 4 may be determined from the outside air temperature, the driving frequency of the compressor 1, the temperature related to the detection of the fifth temperature sensor 19, etc., and then setting change or the like may be performed.

Then, after the first predetermined time T1, the volume margin VV is compared with ACC level C again ([S12]). When it is determined that the volume margin VV is greater than ACC level C, the state shifts to a defrosting control end state ([S17]).

In addition, when it is determined that the volume margin VV in the accumulator 11 is less than ACC level C, the time when the solenoid valve 5 is closed is extended, for example, by a second predetermined time T2 ([S13]). This is for storing a maximum amount of the liquid refrigerant that can be stored within the outdoor heat exchanger 4.

Furthermore, until the volume margin VV becomes less than ACC level C in the accumulator 11, the refrigerant is stored in the liquid-side refrigerant pipe 100. Thus, a liquid pipe liquid volume Vp that should be stored in the liquid-side refrigerant pipe 100 is calculated on the basis of the volume margin VV, the amount Va of refrigerant within the accumulator 11, the amount Vh of refrigerant within the outdoor heat exchanger, and the allowable amount Vmax of the accumulator 11. A liquid pipe liquid volume Vp that meets VV=Vmax−Va−Vh−Vp>ACC level C is calculated. Then, on the basis of the liquid volume Vp within the liquid-side refrigerant pipe 100=$\rho(TH3) \times$Vlp, the outdoor flow control valve 8 is controlled to an outdoor flow control valve 8 opening degree PL1(TH3) that allows the required liquid volume Vp within the liquid-side refrigerant pipe 100 to be stored ([S14]), and the state shifts to a defrosting control end state ([S17]).

On the other hand, when it is determined in step S8 that the volume margin VV is less than ACC level B, the volume margin VV is compared with ACC level A ([S9]). When it is determined that the volume margin VV is greater than ACC level A, the margin is less than ACC level B (ACC level C), the solenoid valve 5 is closed for the first predetermined time T1 ([S11]), similarly to step S10. Furthermore, the outdoor flow control valve 8 is controlled to the outdoor flow control valve 8 opening degree PL1(TH3) for storing the refrigerant in the liquid-side refrigerant pipe 100 ([S14]), and the state shifts to a defrosting control end state ([S17]).

In addition, when it is determined in step S9 that the volume margin VV is less than ACC level A, it is determined that there is no possibility that the refrigerant can be stored within the outdoor heat exchanger 4, until it is determined that the volume margin VV is greater than ACC level C, and thus the refrigerant is stored in the liquid-side refrigerant pipe 100. Thus, the liquid volume Vp within the liquid-side refrigerant pipe 100 is calculated, and setting is performed such that the outdoor flow control valve 8 opening degree PL1(TH3) is provided which allows the required liquid volume Vp within the liquid-side refrigerant pipe 100 to be stored ([S15]). Then, the refrigerant is stored within the liquid-side refrigerant pipe 100 until it is determined that the volume margin VV is less than ACC level A ([S16]), and the state shifts to a defrosting control end state ([S17]).

Figure 6:
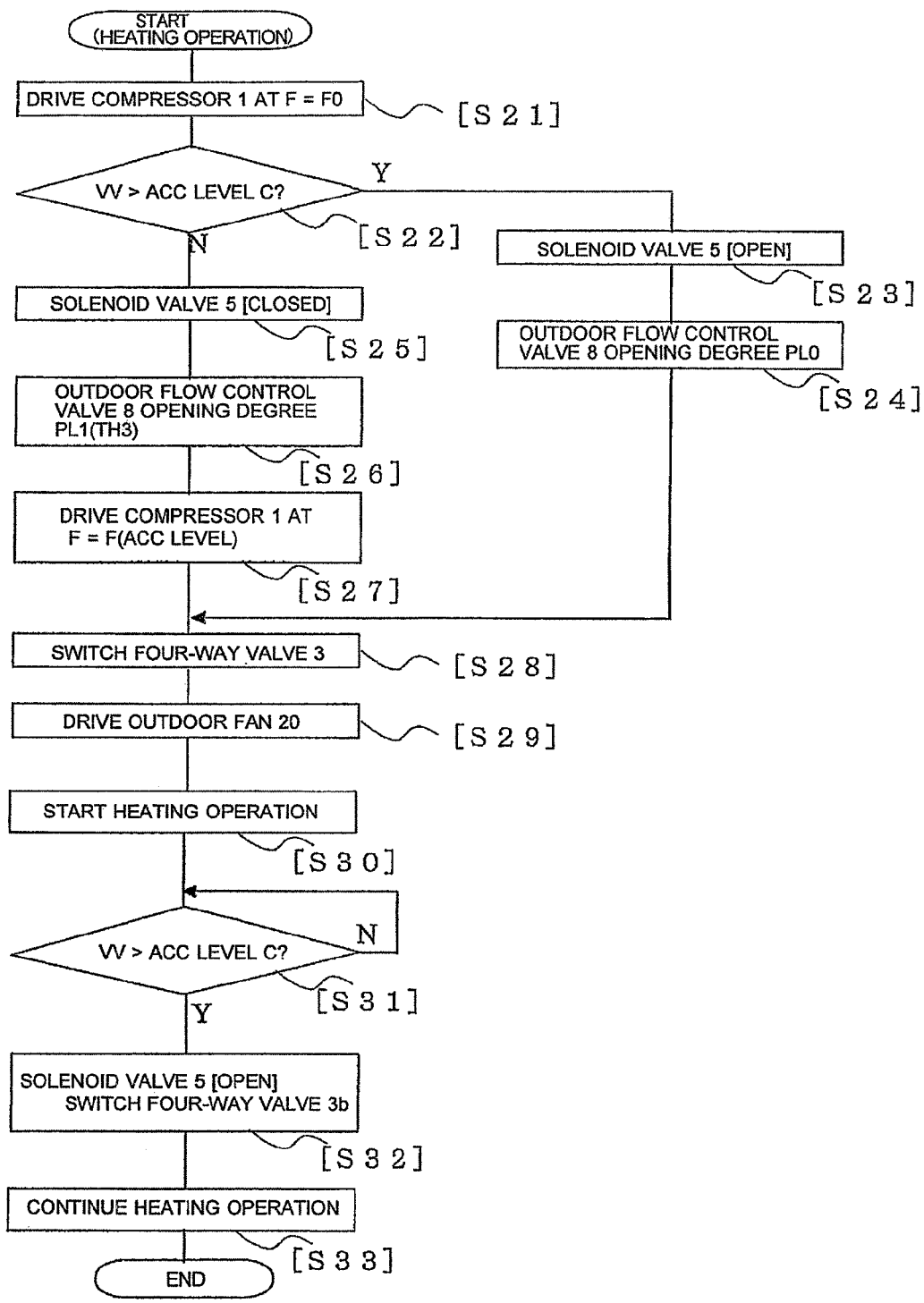
FIG. 6 is a diagram showing flow of a refrigerant control process when shifting to the heating operation in Embodiment 1 of the present invention.

FIG. 6 is a diagram explaining a process related to refrigerant control when shifting to the heating operation. A process performed by the controller 21 will be described with reference to FIG. 6 and the like. First, in order to shift to the heating operation, the compressor 1 is driven at a preset heating operation start frequency F0 ([S21]).

Then, the volume margin VV is compared with ACC level C ([S22]). When it is determined that the volume margin VV is greater than ACC level C, the solenoid valve 5 is made [open] ([S23]). Here, when the solenoid valve 5 is already in a state of [open], the solenoid valve 5 is kept [open]. Then, the outdoor flow control valve 8 is set at a predetermined opening degree (heating start time opening degree) PL0 at the time of start of the heating operation ([S24]). Since it is determined that a sufficient volume margin VV is ensured, the heating start time opening degree PL0 becomes PL0>PL1(TH3). In addition, the opening degree PL0 does not depend on a detection temperature, and is a preset fixed opening degree.

On the other hand, when it is determined in step S22 that the volume margin VV is less than ACC level C, a control action of the solenoid valve 5 is made [closed] ([S25]). Then, correction is made to the liquid refrigerant having been stored (condensed) in the outdoor heat exchanger 4, circulating through the refrigerant circuit and flowing into the accumulator 11. Here, when the solenoid valve 5 is already in a state of [closed], the solenoid valve 5 is kept [closed]. In addition, regarding the outdoor flow control valve 8, when the opening degree of the outdoor flow control valve 8 is PL1(TH3), the opening degree is kept at PL1 (TH3) ([S26]).

Furthermore, an ACC level based on the liquid level state of the accumulator 11 is determined. Then, a heating operation start frequency F(ACC level) is set in accordance with the ACC level ([S27]). Here, the heating operation start frequency F(ACC level) according to the setting is set at FA, FB, and FC for ACC levels A, B, and C, respectively. Heating operation start frequency is set so that F0>FA>FB>FC. This is because, for example, in the case where the liquid level state of the accumulator 11 is a high liquid level state, when the compressor 1 is driven at the heating operation start frequency F0, the speed of the refrigerant flowing into the accumulator 11 is high, and the liquid level within the accumulator 11 may not be stable. Unless the liquid level is stable, there is a possibility that a liquid back volume to the compressor 1 suction side is greatly increased. Thus, the heating operation start frequency F(ACC level) is set in accordance with the ACC level such that the higher (the closer to ACC level A) the liquid level within the accumulator 11 is, the lower the speed of the refrigerant flowing into the accumulator 11 is. Thus, the heating operation start frequency F(ACC level) is set at a driving frequency lower than the heating operation start frequency F0, as described above.

Figure 7:
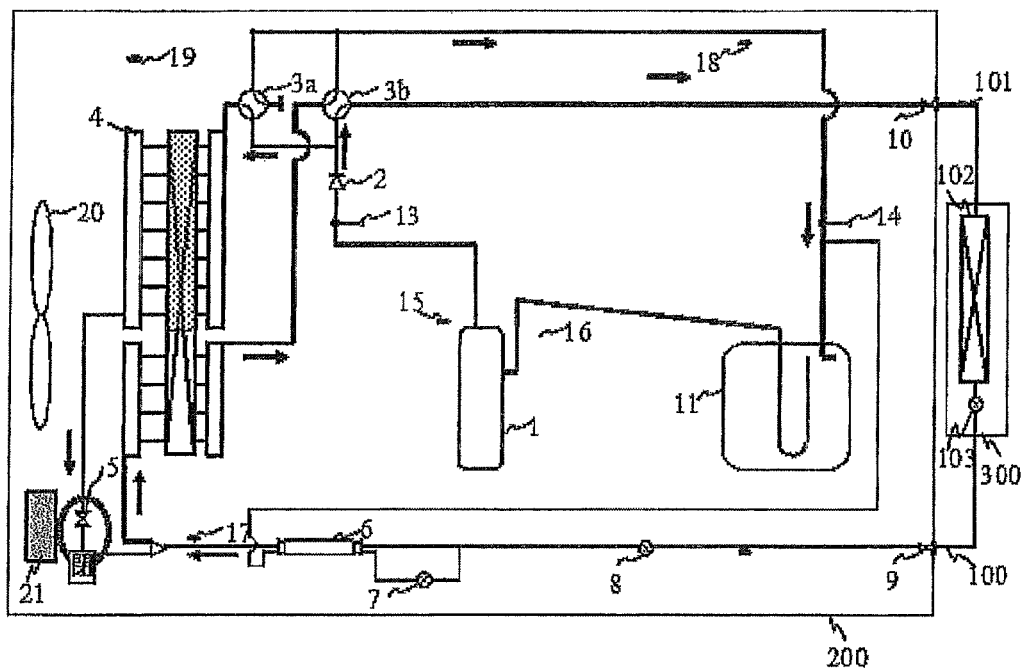
FIG. 7 is a diagram showing flow of the refrigerant by switching of a four-way valve 3.

FIG. 7 is a diagram showing flow of the refrigerant by switching of the four-way valve 3. After the heating operation start frequency is set, the refrigerant flow path is switched by switching of the four-way valve 3a and the four-way valve 3b, in order to shift from the defrosting operation (cooling operation) to the heating operation ([S28]). Here, switching of the four-way valves 3a and 3b is performed, and when the control action of the solenoid valve 5 is set [closed] in step S25, flow paths of the four-way valve 3b that are paired via the solenoid valve 5 and the outdoor heat exchanger 4 are not switched. By so doing, the high-pressure gas refrigerant discharged from the compressor 1 is distributed to the four-way valve 3a and the four-way valve 3b. The high-pressure gas refrigerant having flowed into the four-way valve 3a flows via the gas-side refrigerant pipe 101 to the indoor unit 300 side, to form a circulation path in the heating operation. Meanwhile, the high-pressure gas refrigerant having flowed into the four-way valve 3b is stored in a part within the outdoor heat exchanger 4, since the solenoid valve 5 is [closed]. In this case, the refrigerant having flowed in does not flow back, since the pressure at the refrigerant inlet side of the outdoor heat exchanger 4 is higher than the pressure within the outdoor heat exchanger 4.

The outdoor fan 20 is driven ([S29]), and the heating operation is started ([S30]). Then, the volume margin VV is compared with ACC level C until it is determined that the volume margin VV is greater than ACC level C ([S31]).

Figure 8:
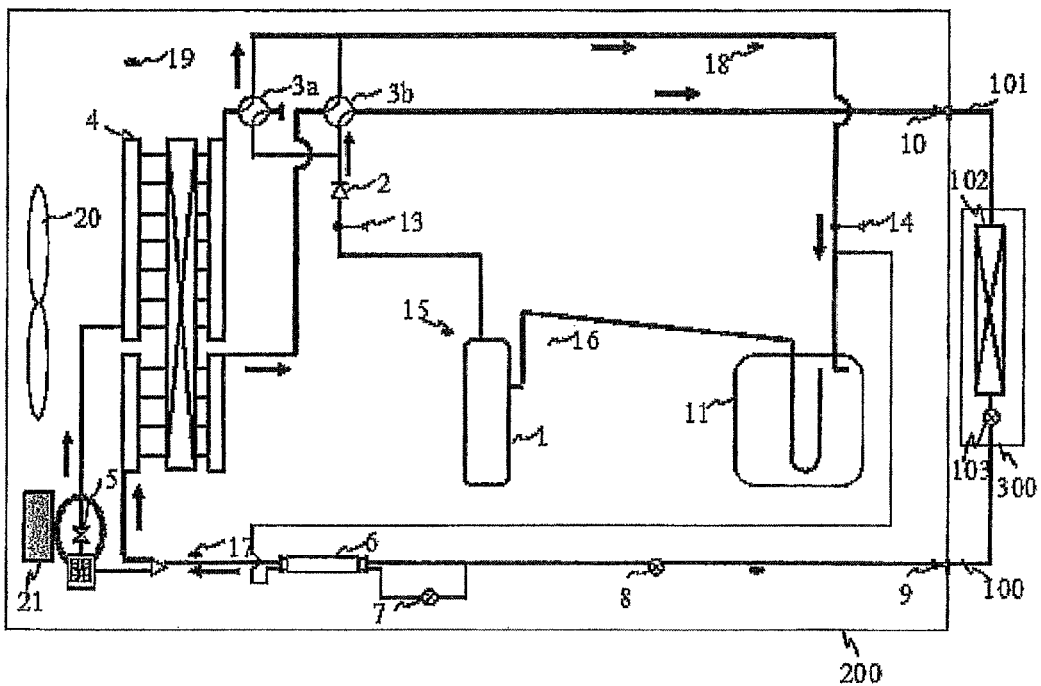
FIG. 8 is a diagram showing flow of the refrigerant by switching of a four-way valve 3b.

FIG. 8 is a diagram showing flow of the refrigerant caused by switching of the four-way valve 3b. When it is determined that the volume margin VV is greater than ACC level C, the control action of the solenoid valve 5 is set [open], the four-way valve 3b is switched ([S32]), and the heating operation is continued ([S33]). Here, when the solenoid valve 5 is already in a state of [open], the solenoid valve 5 is kept [open] (the four-way valve 3b has already been switched to the flow path for the heating operation, and thus is not switched). Then, at that time, the liquid refrigerant stored in the outdoor heat exchanger 4 flows via the four-way valve 3b into the accumulator 11, and the volume margin VV of the accumulator 11 (the allowable amount Vmax of the accumulator 11) is designed such that volume margin VV>amount Vh of refrigerant within the outdoor heat exchanger. Thus, the allowable amount Vmax within the accumulator 11 is not exceeded to cause overflow.

By performing the above process, when shifting from defrosting control to the heating operation, the liquid refrigerant that is condensed during the defrosting operation and is distributed in the outdoor heat exchanger 4 and the liquid-side refrigerant pipe 100 flows into the accumulator 11 from a state where the liquid level in the accumulator 11 is high and the volume margin VV is low, whereby it is possible to correct overflow and to ensure reliability of the air-conditioning apparatus (compressor 1).

Here, as described above, when shifting from the defrosting operation to the heating operation, if a part of the outdoor heat exchanger 4 is used for storing an excess refrigerant, there is a possibility that the evaporation ability of the outdoor heat exchanger 4 is diminished. Thus, in order to suppress diminishment of the evaporation ability when a part of the outdoor heat exchanger 4 is blocked, the air volume of the outdoor fan 20 is preferably increased during a period when the part of the outdoor heat exchanger 4 is blocked. Thus, a decrease in the heat exchange area of the outdoor heat exchanger 4 is covered by increasing the heat exchange-passing air volume, thereby suppressing diminishment of the evaporation ability.

In addition, similarly to the above, when the volume of the outdoor heat exchanger 4 is deceased in order to suppress diminishment of the evaporation ability, the pressure loss is increased when the same circulation amount of the refrigerant is caused to flow during the heating operation, and the evaporation ability is diminished. Thus, the circulation amount of the refrigerant flowing into the outdoor heat exchanger 4 is controlled by using the subcooling heat exchanger 6 in FIG. 1 and the like to control an outdoor heat exchanger capacity control regulating valve (flow control valve) 22, and by bypassing to the subcooling heat exchanger low-pressure side bypass pipe 12 of the subcooling heat exchanger 6. In addition, by heat exchange being performed by the subcooling heat exchanger 6, it is possible to increase an enthalpy at an inlet of the outdoor heat exchanger 4 (evaporator) and to ensure the evaporation ability.

Embodiment 2

Figure 9:
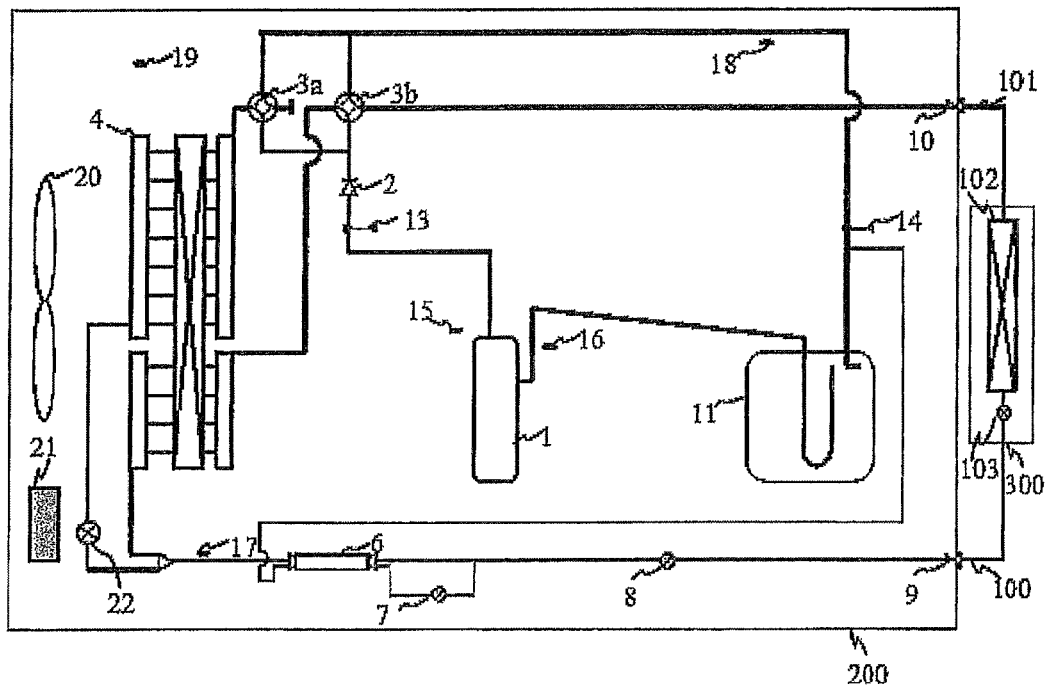
FIG. 9 is a diagram showing a configuration of an air-conditioning apparatus according to Embodiment 2 of the present invention.

FIG. 9 is a diagram showing a configuration of an air-conditioning apparatus according to Embodiment 2 of the present invention. In FIG. 9, devices and the like designated by the same reference signs as in FIG. 1 perform the same operations as described in Embodiment 1. In the air-conditioning apparatus according to the embodiment, an outdoor heat exchanger capacity control regulating valve (hereinafter, referred to as flow control valve) 22 which configures storage adjusting means is provided instead of the solenoid valve 5 described in Embodiment 1. The flow control valve 22 is a flow control device which allows linear control to be performed thereon and which is able to adjust an opening degree on the basis of an instruction from the controller 21. Thus, it is possible to subdivide and set the ACC level in accordance with the volume margin VV. Thus, it is possible to more finely adjust the amount of the liquid refrigerant stored in the outdoor heat exchanger 4 and the amount of the stored liquid refrigerant flowing into the accumulator 11.

Figure 10:
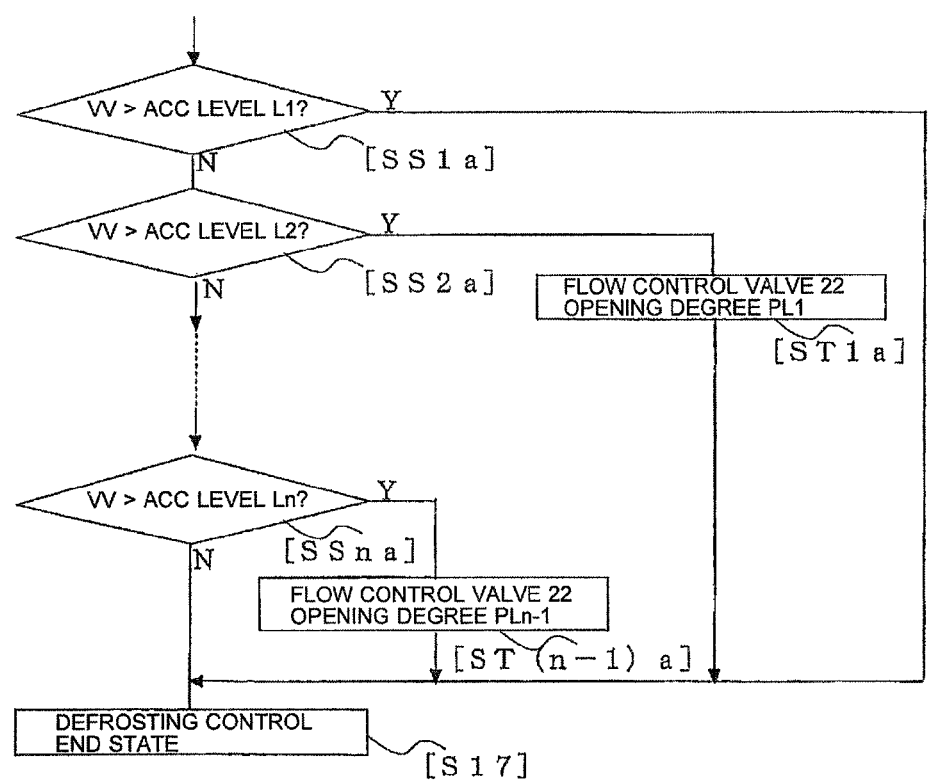
FIG. 10 is a diagram showing flow of a control process in Embodiment 2 of the present invention.

FIG. 10 is a diagram showing flow of a control process according to Embodiment 2 of the present invention. The controller 21 in the air-conditioning apparatus according to the embodiment performs the control process shown in FIG. 10 instead of steps S7 to S9 shown in FIG. 3. For example, ACC levels of n stages are set as L1, L2, . . . , Ln, opening degrees of the flow control valve 22 are set as PL1, PL2, . . . , PLn−1 in accordance with the respective ACC levels.

The controller 21 compares the volume margin VV with the ACC levels in a stepwise manner ([SS1$a$] to [SSn$a$]). Then, when the controller 21 determines that a condition is met, the controller 21 sends an instruction to the flow control valve 22, controls the flow control valve 22 to be a set opening degree ([ST1$a$] to [ST(n−1)a]), and shifts to a defrosting control end state ([S17]).

As described above, according to the air-conditioning apparatus of Embodiment 2, since the flow control valve 22 is provided, it is possible to more finely adjust the amount of the liquid refrigerant stored in the outdoor heat exchanger 4 during the defrosting operation. Thus, it is possible to minimize the amount of the liquid refrigerant stored in the outdoor heat exchanger 4. Then, after the defrosting operation ends to shift to the heating operation, when causing the liquid refrigerant stored in the outdoor heat exchanger 4 to flow into the accumulator 11, it is possible to minimize a transient unstable phenomenon of a cycle caused by pressure and temperature fluctuations, and it is possible to provide a more stable air-conditioning apparatus.

Embodiment 3

Figure 11:
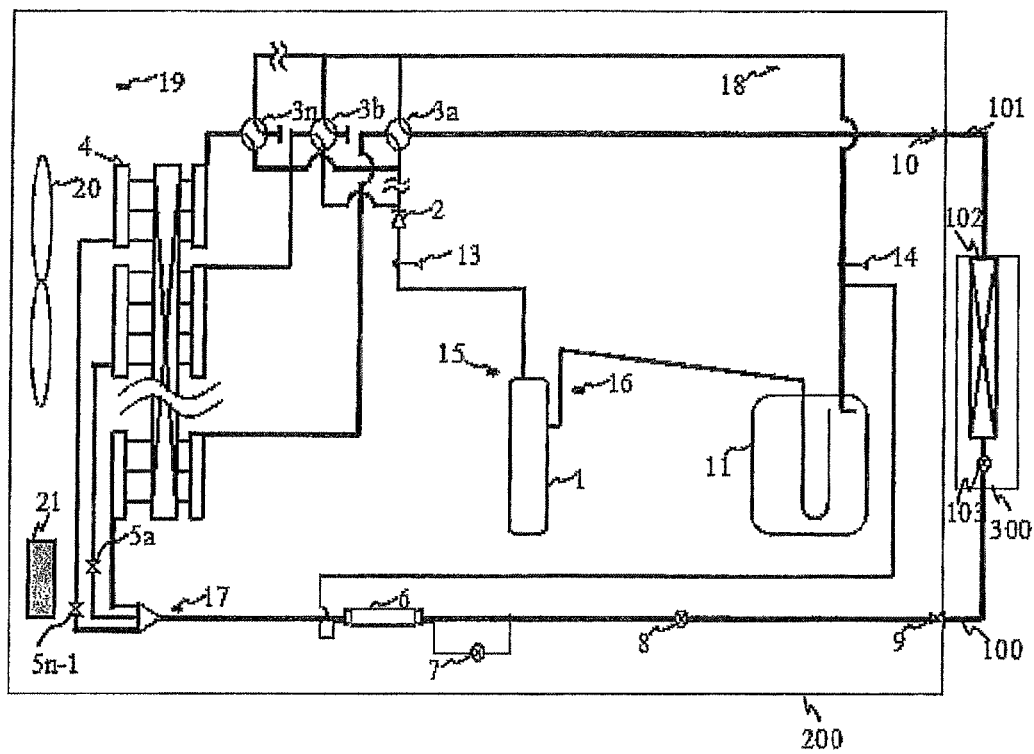
FIG. 11 is a diagram showing a configuration of an air-conditioning apparatus according to Embodiment 3 of the present invention.

FIG. 11 is a diagram showing a configuration of an air-conditioning apparatus according to Embodiment 3 of the present invention. In FIG. 11, devices and the like designated by the same reference signs as in FIG. 1 perform the same operations as described in Embodiment 1. The air-conditioning apparatus of the embodiment includes a plurality of four-way valves 3 and a plurality of solenoid valves 5 which configure storage adjusting means. Here, in accordance with set ACC levels of n stages, the number of the four-way valves 3 is n, and the number of the solenoid valves 5 is n−1 (one flow path becomes a flow path of a refrigerant circuit). Thus, for example, it is possible to set the amount of the refrigerant flowing into or out of the outdoor heat exchanger 4, at a plurality of stages, and it is possible to subdivide and set the ACC level in accordance with the volume margin VV. Thus, it is possible to more finely adjust the amount of the liquid refrigerant stored in the outdoor heat exchanger 4 and the amount of the stored liquid refrigerant flowing into the accumulator 11 in a stepwise manner.

Figure 12:
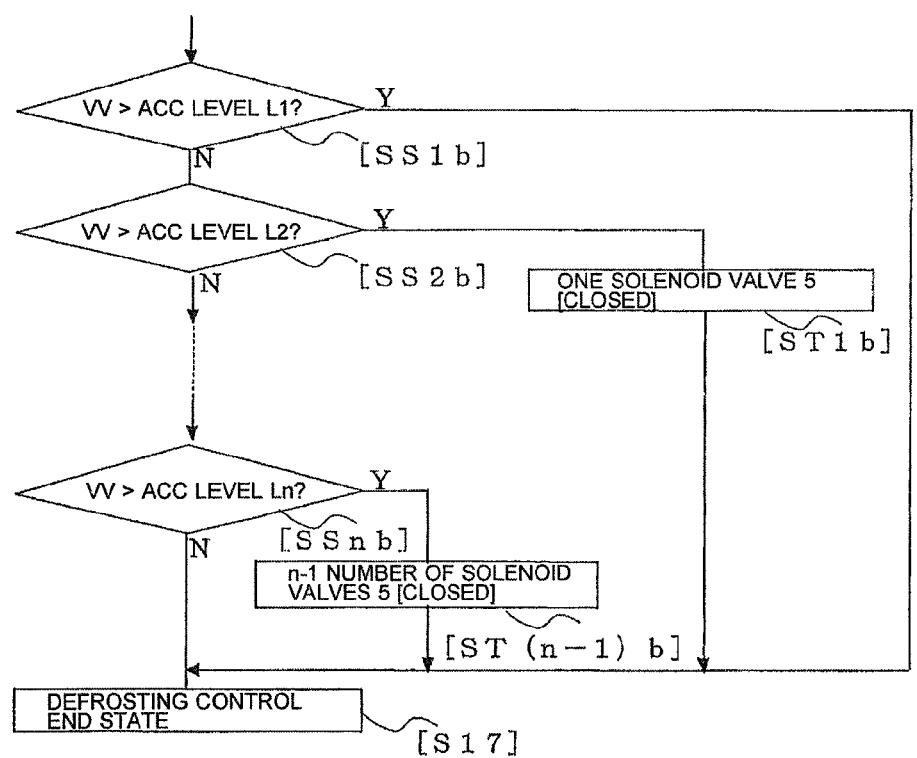
FIG. 12 is a diagram showing flow of a control process in Embodiment 3 of the present invention.

FIG. 12 is a diagram showing flow of a control process according to Embodiment 3 of the present invention. The controller 21 in the air-conditioning apparatus of the embodiment performs the control process shown in FIG. 12 instead of steps S7 to S9 shown in FIG. 3. In the case where ACC levels of n stages are set as L1, L2, . . . , Ln, of the plurality of solenoid valves 5, the number of the solenoid valves 5 that are made [closed] in accordance with each ACC level is set at 1 to n−1. Here, for example, by equalizing the amount of the liquid refrigerant stored in the outdoor heat exchanger 4 when each solenoid valve 5 is closed, it is possible to perform linear control.

The controller 21 compares the volume margin VV with the ACC levels in a stepwise manner ([SS1$b$] to [SSn$b$]). Then, when the controller 21 determines that a condition is met, for example, the controller 21 sends an instruction to the solenoid valves 5 that are to be closed, and makes the corresponding number of the solenoid valves 5 to be [closed] ([ST1$b$] to [ST(n−1)b]). At that time, the corresponding four-way valves 3 are switched in conjunction with this. Then, the controller 21 shifts to a defrosting control end state ([S17]).

As described above, according to the air-conditioning apparatus of Embodiment 3, since the air-conditioning apparatus includes the plurality of four-way valves 3 and the plurality of solenoid valves 5, it is possible to more finely adjust the amount of the liquid refrigerant stored in the outdoor heat exchanger 4 during the defrosting operation. Thus, it is possible to minimize the amount of the liquid refrigerant stored in the outdoor heat exchanger 4. Then, after the defrosting operation ends to shift to the heating operation, when causing the liquid refrigerant stored in the outdoor heat exchanger 4 to flow into the accumulator 11, it is possible to minimize a transient unstable phenomenon of a cycle caused by pressure and temperature fluctuations, and it is possible to provide a more stable air-conditioning apparatus.

Embodiment 4

Figure 13:
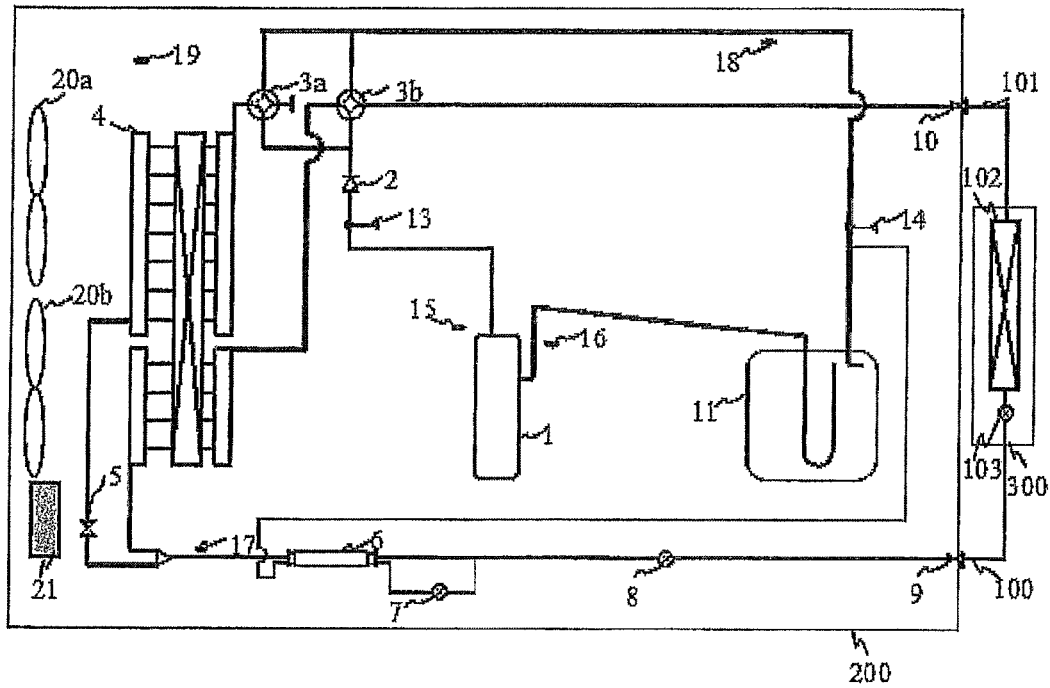
FIG. 13 is a diagram showing a configuration of an air-conditioning apparatus according to Embodiment 4 of the present invention.

FIG. 13 is a diagram showing a configuration of an air-conditioning apparatus according to Embodiment 4 of the present invention. In FIG. 13, devices and the like designated by the same reference signs as in FIG. 1 perform the same operations as described in Embodiment 1. In the air-conditioning apparatus of the embodiment, two of the outdoor fans 20 described in Embodiment 1 are provided in parallel. The respective outdoor fans 20 are referred to as outdoor fans 20a and 20b. Here, a FAN air volume (rotation speed) of the outdoor fan 20a is set in accordance with set ACC levels of n stages. Thus, for example, it is possible to set the amount of the refrigerant stored in the outdoor heat exchanger 4, at a plurality of stages, and it is possible to subdivide and set the ACC level in accordance with the volume margin VV. Thus, it is possible to adjust the amount of the liquid refrigerant stored in the outdoor heat exchanger 4 and the amount of the stored liquid refrigerant flowing into the accumulator 11.

Figure 14:
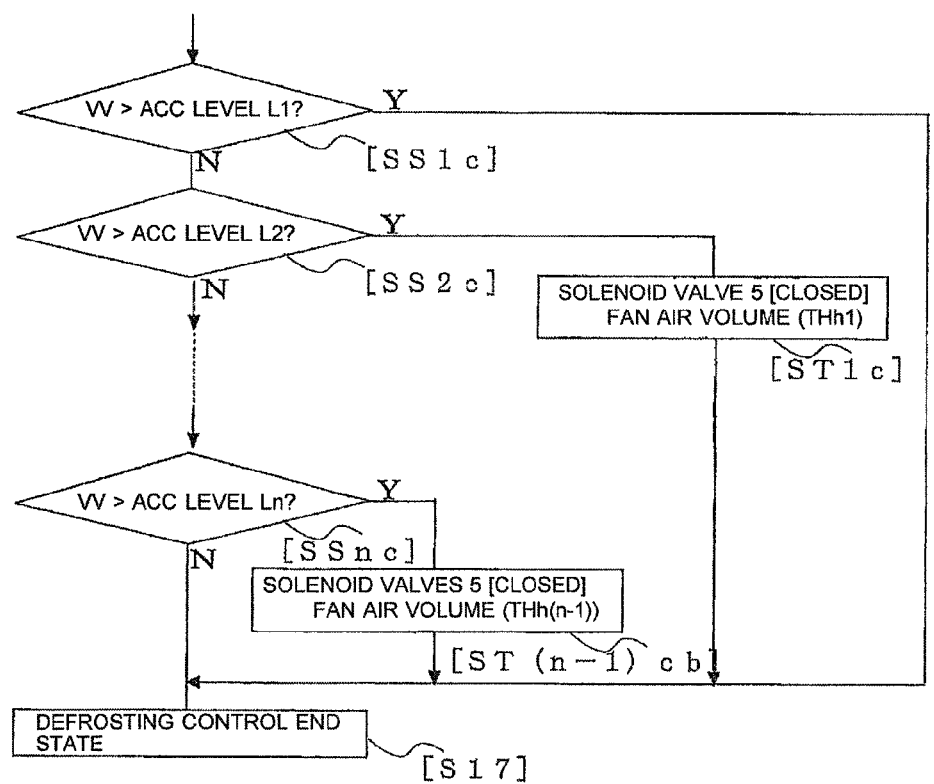
FIG. 14 is a diagram showing flow of a control process in Embodiment 4 of the present invention.

FIG. 14 is a diagram showing flow of a control process according to Embodiment 4 of the present invention. The controller 21 in the air-conditioning apparatus of the embodiment performs the control process shown in FIG. 14 instead of steps S7 to S9 shown in FIG. 3. In the case where ACC levels of n stages are set as L1, L2, . . . , Ln, the FAN air volume (rotation speed) of the outdoor fan 20a is set at 1 to n−1 stages in accordance with the respective ACC levels.

The controller 21 compares the volume margin VV with the ACC levels in a stepwise manner ([SS1c] to [SSnc]). Then, when the controller 21 determines that a condition is met, the controller 21 changes the control action of the solenoid valve 5 to [closed], sends an instruction to the outdoor fan 20a, drives the outdoor fan 20a at a corresponding FAN air volume (rotation speed) ([ST1c] to [ST(n−1)c]), and shifts to a defrosting control end state ([S17]).

As described above, according to the air-conditioning apparatus of Embodiment 4, since the air-conditioning apparatus includes the outdoor fans 20a and 20b and the outdoor fan 20a is driven at the FAN air volume (rotation speed) based on the ACC level for the volume margin VV, it is possible to more finely adjust the amount of the liquid refrigerant stored in the outdoor heat exchanger 4 during the defrosting operation. Thus, it is possible to minimize the amount of the liquid refrigerant stored in the outdoor heat exchanger 4. Then, after the defrosting operation ends to shift to the heating operation, when causing the liquid refrigerant stored in the outdoor heat exchanger 4 to flow into the accumulator 11, it is possible to minimize a transient unstable phenomenon of a cycle caused by pressure and temperature fluctuations, and it is possible to provide a more stable air-conditioning apparatus.

The invention claimed is:

1. An outdoor unit connected to an indoor unit via a pipe to form a refrigerant circuit, the outdoor unit comprising: a compressor which compresses a sucked refrigerant and discharges the refrigerant; an outdoor heat exchanger which exchanges heat between outdoor air and the refrigerant; an accumulator which stores a liquefied refrigerant at a suction side of the compressor; a storage adjusting unit for storing the refrigerant in the outdoor heat exchanger; and a controller, the controller is configured to perform control so as to cause the refrigerant stored within the outdoor heat exchanger during a defrosting operation to flow into the accumulator on a basis of an amount of refrigerant within the accumulator when operation is switched by a four-way valve to a heating operation from the defrosting operation, and control a level of the liquefied refrigerant in the accumulator in a stepwise manner to equalize an amount of liquid refrigerant stored in the outdoor heat exchanger, and switch to a defrosting control end state when the volume margin is within a predetermined threshold, and the four-way valve is configured to operate reversibly in a cooling operation and the heating operation on the basis of control by the controller.

2. The outdoor unit of claim 1, wherein
the storage adjusting unit includes a flow control valve, and
the controller controls an opening degree of the flow control valve in order to adjust at least one of an amount of the refrigerant stored within the outdoor heat exchanger during the defrosting operation and an amount of refrigerant caused to flow into the accumulator side when the heating operation is performed.

3. The outdoor unit of claim 2, further comprising an outdoor flow control unit between the outdoor heat exchanger and the pipe, wherein
the controller controls the outdoor flow control unit on the basis of the amount of refrigerant within the accumulator in order to adjust the refrigerant within the pipe and cause the refrigerant to flow into the accumulator, when operation is switched to the heating operation from the defrosting operation.

4. The outdoor unit of claim 3, wherein the controller is further configured to determine a compressor capacity on the basis of the amount of refrigerant in the accumulator, when operation is switched to the heating operation from the defrosting operation.

5. The outdoor unit of claim 2, wherein the controller is further configured to determine a compressor capacity on the basis of the amount of refrigerant in the accumulator, when operation is switched to the heating operation from the defrosting operation.

6. The outdoor unit of claim 1, wherein
the storage adjusting unit includes one or a plurality of opening/closing valves, and
the controller controls opening/closing of the one or the plurality of opening/closing valves in order to adjust at least one of an amount of the refrigerant stored within the outdoor heat exchanger during the defrosting operation and an amount of refrigerant caused to flow into the accumulator when the heating operation is performed.

7. The outdoor unit of claim 6, further comprising an outdoor flow control unit between the outdoor heat exchanger and the pipe, wherein
the controller controls the outdoor flow control unit on the basis of the amount of refrigerant within the accumulator in order to adjust the refrigerant within the pipe and cause the refrigerant to flow into the accumulator, when operation is switched to the heating operation from the defrosting operation.

8. The outdoor unit of claim 7, wherein the controller is further configured to determine a compressor capacity on the basis of the amount of refrigerant in the accumulator, when operation is switched to the heating operation from the defrosting operation.

9. The outdoor unit of claim 3, wherein the controller is further configured to determine a compressor capacity on the basis of the amount of refrigerant in the accumulator, when operation is switched to the heating operation from the defrosting operation.

10. The outdoor unit of claim 1, further comprising:
an outdoor flow control unit between the outdoor heat exchanger and the pipe, wherein
the controller controls the outdoor flow control unit on the basis of the amount of refrigerant within the accumulator in order to adjust the refrigerant within the pipe and cause the refrigerant to flow into the accumulator, when operation is switched to the heating operation from the defrosting operation.

11. The outdoor unit of claim 10, wherein the controller is further configured to determine a compressor capacity on the basis of the amount of refrigerant in the accumulator, when operation is switched to the heating operation from the defrosting operation.

12. The outdoor unit of claim 1, wherein the controller is further configured to determine a compressor capacity on the basis of the amount of refrigerant in the accumulator when operation is switched to the heating operation from the defrosting operation.

13. The outdoor unit of claim 1, wherein the controller is further configured to calculate the amount of refrigerant in the accumulator on the basis of at least one of a degree of superheat at a discharge side of the compressor and a degree of superheat at a suction side of the compressor.

14. The outdoor unit of claim 1, wherein the controller performs control so as to cause the refrigerant in the accumulator to be stored in the refrigerant circuit, when the defrosting operation ends.

15. The outdoor unit of claim 14, further comprising an outdoor fan which blows air which is subjected to heat exchange with the refrigerant in the outdoor heat exchanger, wherein the controller controls an air volume of the outdoor fan during the defrosting operation in order to adjust an amount of the refrigerant stored within the outdoor heat exchanger.

16. An air-conditioning apparatus comprising:

the outdoor unit of claim 1; and an indoor unit including an indoor side heat exchanger which exchanges heat between the refrigerant and air in an air-conditioning target space and an expansion device which adjusts a pressure of the refrigerant flowing through the indoor side heat exchanger, the indoor unit being connected to the outdoor unit via a pipe to form a refrigerant circuit.

17. The outdoor unit of claim 1, wherein the four-way valve comprises a plurality of four-way valves connected in parallel in the refrigerant circuit.

* * * * *